(12) United States Patent
Narisawa et al.

(10) Patent No.: US 6,403,225 B1
(45) Date of Patent: Jun. 11, 2002

(54) ARTICLE SUPERIOR IN SLIPPING WATERDROPS DOWN SURFACE THEREOF

(75) Inventors: Ikuo Narisawa, 7-31, Midorimachi 1 chome, Yamagata-shi, Yamagata 990-0041; Makoto Takeishi, 1-3-39, Josei, Yonezawa-shi, Yamagata 992-0054; Heihachi Murase, 534, Higashikoiso, Oiso-machi, Naka-gun, Kanagawa 255-0004; Toshihiro Takekawa, Kanagawa; Yasuaki Kai, Yokohama; Tetsuro Tayu, Kanagawa, all of (JP)

(73) Assignees: Nissan Motor Co., Ltd., Yokohama; Ikuo Narisawa, Yamagata; Makoto Takeishi, Yonezawa; Heihachi Murase, Kanagawa, all of (JP)

( * ) Notice: Subject to any disclaimer, the term of this patent is extended or adjusted under 35 U.S.C. 154(b) by 0 days.

(21) Appl. No.: 09/438,146

(22) Filed: Nov. 10, 1999

(30) Foreign Application Priority Data

Nov. 10, 1998 (JP) .......................... 10-319397

(51) Int. Cl.$^7$ ............................. B32B 17/06; B32B 9/04
(52) U.S. Cl. ....................... 428/429; 428/447; 428/448
(58) Field of Search ........................... 427/387; 428/428, 428/429, 447, 448

(56) References Cited

U.S. PATENT DOCUMENTS

| | | | |
|---|---|---|---|
| 5,284,707 A | 2/1994 | Ogawa et al. | 428/333 |
| 5,324,566 A | 6/1994 | Ogawa et al. | 428/141 |
| 5,407,709 A | 4/1995 | Ogawa et al. | 427/539 |
| 5,413,865 A | 5/1995 | Nakamura et al. | 428/432 |
| 5,437,894 A | 8/1995 | Ogawa et al. | 427/535 |
| 5,605,958 A * | 2/1997 | Yoneda et al. | 524/755 |
| 5,645,939 A * | 7/1997 | Yoneda et al. | 428/429 |
| 5,674,625 A | 10/1997 | Takahashi et al. | 428/428 |
| 5,856,016 A | 1/1999 | Takahashi et al. | 428/428 |
| 5,871,843 A * | 2/1999 | Yoneda et al. | 428/337 |
| 5,993,910 A * | 11/1999 | Carre et al. | 427/387 |
| 5,998,541 A * | 12/1999 | Ogawa | 524/730 |
| 6,033,738 A * | 3/2000 | Teranishi et al. | 427/387 |

FOREIGN PATENT DOCUMENTS

| | | |
|---|---|---|
| JP | 58-122979 | 7/1983 |
| JP | 58-129082 | 8/1983 |
| JP | 58-142958 | 8/1983 |
| JP | 58-147483 | 9/1983 |
| JP | 58-167448 | 10/1983 |
| JP | 58-172242 | 10/1983 |
| JP | 58-172244 | 10/1983 |
| JP | 58-172245 | 10/1983 |
| JP | 58-172246 | 10/1983 |
| JP | 58-190840 | 11/1983 |
| JP | 58-223634 | 12/1983 |
| JP | 4-255343 | 9/1992 |
| JP | 6-16455 | 1/1994 |
| JP | 6-340451 | 12/1994 |
| JP | 7-9608 | 1/1995 |
| JP | 7-138046 | 5/1995 |
| JP | 7-138047 | 5/1995 |
| JP | 7-138050 | 5/1995 |
| JP | 7-267684 | 10/1995 |
| JP | 8-40748 | 2/1996 |

* cited by examiner

Primary Examiner—Robert Dawson
Assistant Examiner—Michael J Feely
(74) Attorney, Agent, or Firm—Foley & Lardner

(57) ABSTRACT

The invention relates to an article superior in slipping a waterdrop down a surface of the article. The article has a substrate; and a functional layer formed on a surface of the substrate. The functional layer is chemically bonded to the surface of the substrate through siloxane-bonding. The article is prepared by a method including: (a) dissolving in a solvent (1) a silicone that is one of a first silicone having at an end a hydrolyzable functional group and a second silicone having at an end a hydrolyzable functional group and at the other end a fluoroalkyl group, (2) an acid, and (3) water, thereby to prepare a mixed liquid; (b) applying the mixed liquid to the surface of the substrate, thereby to form thereon a precursory layer; and (c) drying the precursory layer into the functional layer. In the preparation of the article, a silica precursor sol is optionally added to the mixed liquid. Alternatively, a combination of a silica precursor sol and a fluoroalkylsilane having at its end a hydrolyzable functional group is optionally added to the mixed liquid. Furthermore, an underlayer made from a hydrolyzable silicon compound may be provided between the substrate and the functional layer.

15 Claims, No Drawings

ARTICLE SUPERIOR IN SLIPPING WATERDROPS DOWN SURFACE THEREOF

BACKGROUND OF THE INVENTION

The present invention relates to an article superior in making waterdrops slip down the surface of the article. This article can be used as a window pane of various vehicles, watercraft and aircraft.

Hitherto, there have been various proposals for increasing water-repellency of an object in order to remove waterdrops from the surface of the object. Japanese Patent Unexamined Publications JP-A-58-122979, JP-A-58-129082, JP-A-58-142958, JP-A-58-147483, JP-A-58-172242, JP-A-58-172244, JP-A-58-172245, JP-A-58-172246, JP-A-58-190840, and JP-A-58-223634 disclose agents that are capable of providing a glass surface with water-repellency. JP-A-58-167448 discloses a low reflectance glass. JP-A-6-16455, JP-A-6-340451, JP-A-7-138046, JP-A-7-138047, JP-A-7-138050, JP-A-7-267684, and JP-A-8-40748 disclose water-repellent glass panes. JP-A-7-9608 and JP-A-4-255343 disclose water-repellent, oil-repellent coating films.

SUMMARY OF THE INVENTION

"The angle of waterdrop slippage" can be defined as being an angle of a surface of an article to the level, at which a waterdrop starts slipping down the surface of the article by tilting the article after the deposition of the waterdrop in a predetermined amount on the surface of the article set horizontal. As the angle of waterdrop slippage becomes smaller, the surface of an article becomes superior or easier in making waterdrops slip down the surface of the article.

It is therefore an object of the present invention to provide an article that is small in angle of waterdrop slippage and thereby superior in making small waterdrops slip down the surface of the article.

According to the present invention, there is provided an article superior in slipping a waterdrop down a surface of the article. The article has a substrate; and a functional layer formed on the surface of the substrate. The functional layer is chemically bonded to the surface of the substrate through siloxane-bonding. The article is prepared by a method comprising: (a) preparing a mixed liquid; (b) applying the mixed liquid to the surface of the substrate, thereby to form thereon a precursory layer; and (c) drying the precursory layer into the functional layer. According to a first aspect of the invention, the mixed liquid is prepared by dissolving in a solvent (1) a silicone that is one of a first silicone having at an end a hydrolyzable functional group and a second silicone having at an end a hydrolyzable functional group and at the other end a fluoroalkyl group, (2) an acid, and (3) water. According to a second aspect of the invention, the mixed liquid is prepared by dissolving in a solvent (1) the above silicone, (2) a silica precursor sol, (3) an acid, and (4) water. According to a third aspect of the invention, the mixed liquid is prepared by dissolving in a solvent (1) the above silicone, (2) a fluoroalkylsilane having at its end a hydrolyzable functional group, (3) a silica precursor sol, (4) an acid, and (5) water. Furthermore, an underlayer made from a hydrolyzable silicon compound may be provided between the substrate and the functional layer. In this case, the functional layer is chemically bonded to the surface of the underlayer through siloxane-bonding.

DESCRIPTION OF THE PREFERRED EMBODIMENTS

As stated above, the special silicone is used in the invention as an essential component of the mixed liquid. With this, the obtained article becomes unexpectedly superior in making waterdrops slip down the surface of the article. Furthermore, many reaction sites (i.e., the hydrolyzed functional groups) of the silicone are chemically bonded to the surface of a substrate. Thus, the article becomes superior in durability, too.

As stated above, according to the second aspect of the invention, the mixed liquid is prepared by dissolving in a solvent the silicone, a silica precursor sol, an acid, and water. It is preferable that these silicone and silica precursor sol are dissolved at first in a solvent and then these acid and water are added thereto. According to the third aspect of the invention, the mixed liquid is prepared by dissolving in a solvent the silicone, the fluoroalkylsilane (FAS), a silica precursor sol, an acid and water. It is preferable that these silicone, silica precursor sol and fluoroalkylsilane are dissolved at first in a solvent and then these acid and water are added thereto. The silica precursor sol of the second and third aspects of the invention contains a silica precursor. This sol is capable of turning into a gel and then into silica ($SiO_2$) through baking of the gel.

In the invention, it is optional to form between the substrate and the functional layer an underlayer that has at its surface many reaction sites reactive with the silicone of the functional layer. With this, it becomes possible to increase the reaction sites of the silicone that are bonded to the underlayer. Therefore, it becomes possible to further improve the article in making waterdrops slip down the surface of the article. The underlayer may be prepared by a method comprising (a) applying a silicon compound (e.g., tetraisocyanate silane) that is hydrolyzable at a relatively low temperature (e.g., room temperature), to the surface of the substrate, thereby forming thereon a precursory layer; and (b) drying the precursory layer into the underlayer. If, for example, tetraisocyanate silane is applied to a glass substrate, it is hydrolyzed at room temperature by moisture in the air and then dried at a drying temperature into a silica film. This silica film is strongly attached to the glass substrate through siloxane-bonding. The silica film further has at its surface many silanol groups, which are reactive with the silicone and with the hydrolyzable functional groups of the fluoroalkylsilane of the functional layer. The lower the drying temperature for forming the silica film, the greater the number of silanol groups formed on the surface of the silica film. In view of this, it is the most preferable to use tetraisocyanate silane as the coating liquid, because tetraisocyanate silane can be dried into a silica film at room temperature. Alternatively, perhydropolysilazane can be used as the coating liquid.

In the invention, it is necessary to use in the preparation of the article the above special silicone that is one of (1) a first silicone having at its end a hydrolyzable functional group and (2) a second silicone having at its one end a hydrolyzable functional group and at the other end a fluoroalkyl group. A functional layer can be formed on a glass substrate by dissolving the special silicone in an organic solvent (e.g., alcohol) and then by applying the resultant coating liquid to the glass substrate. After this application, the functional end-group of the silicone is hydrolyzed by moisture in the air. With this, the hydrolyzed end-group is chemically bonded to the surface of the glass substrate. Therefore, the obtained functional layer becomes superior in durability. If acid and water are additionally added to the coating liquid, it becomes possible to accelerate the hydrolysis of the functional end-group of the silicone. In particular, in case that the substrate is made of glass, more reaction-sites (i.e., the hydrolyzed functional groups) of the silicone are chemically bonded to the surface of the substrate by the addition of acid and water to the coating liquid. With this, the article becomes superior in durability and also in slipping waterdrops down the surface of the article. The acid content of the coating liquid is preferably from 0.001 to 0.2 wt %. The water content of the coating liquid is preferably from 0.1 to 20 wt %.

If the second silicone, which has at its one end a hydrolyzable functional group and at the other end a fluoroalkyl group, is used as the silicone in the preparation of the mixed liquid, the obtained article may become superior in oil-repellency as well as in slipping waterdrops down the surface of the article. This oil-repellency may also be obtained by using the above-mentioned fluoroalkylsilane according to the third aspect of the invention. The use of too much amount of this fluoroalkylsilane, however, may cause an adverse effect on the article in slipping waterdrops down the surface of the article.

In accordance with the second and third aspects of the invention, a small amount of a silica precursor sol may be added to the special silicone. With this, more reaction-sites of the functional layer are chemically bonded to the surface of the substrate. Thus, it becomes possible to further improve the article in slipping waterdrops down the surface of the article, since the silica precursor sol has many functional groups that are capable of reacting with the substrate's surface and with the functional groups of the silicone of the functional layer. Thus, this silicone can be bonded directly to the substrate and at the same time can be bonded indirectly thereto through its bonding with the silica precursor sol. Therefore, it becomes possible to increase the number of the reaction sites of the silicone that are bonded to the substrate's surface. For obtaining this increase, it is optional to combine the addition of a silica precursor sol to the special silicone with the above-described formation of the underlayer.

In the invention, each hydrolyzable, functional end-group of the first and second silicones is not particularly limited as long as it is hydrolyzable and thereby can chemically be bonded to the substrate or the underlayer. Each end-group is preferably at least one group selected from alkoxysilyl groups, hydroxysilyl groups, halogenated silyl groups (e.g., Si—F, Si—Cl, Si—Br, and Si—I), acyloxysilyl groups, and isocyanate silyl groups.

In the invention, it is preferable that the special silicone has a molecular weight of greater than 1,000 in order to improve the article in making waterdrops slip down the surface thereof. If its molecular weight is not greater than 1,000, the article may become inferior in making waterdrops slip down the surface thereof. It is assumed that methyl groups (hydrophobic groups) of the silicone are not oriented in good order at the surface of the functional layer if the molecular weight is not greater than 1,000.

In the invention, the content of the solid matter of the silicone in the mixed liquid is preferably from 0.05 to 20 wt %, particularly from 0.5 to 5 wt %. With this, the article is improved in making waterdrops slip down the surface thereof, and the functional layer becomes sufficiently transparent. If it is less than 0.05 wt %, the number of the reaction sites of the silicone that are bonded to the surface of the substrate or underlayer may become too small. With this, the article may become inferior in making waterdrops slip down the surface thereof. If it is greater than 20 wt %, the silicone may be aggregated after the application of the mixed liquid. With this, the distribution of the reaction sites of the silicone may become uneven. Thus, the article may become inferior in making waterdrops slip down the surface thereof.

According to the second aspect of the invention, the ratio by weight of the solid matter of the silica precursor sol to the solid matter of the silicone is preferably from 0.001 to 0.5, particularly from 0.005 to 0.1. Similarly, according to the third aspect of the invention, the ratio by weight of the solid matter of the silica precursor sol to the total solid matters of the mixed liquid is preferably from 0.001 to 0.5, particularly from 0.005 to 0.1. If it is less than 0.001 in each of the second and third aspects of the invention, it may not be possible to further increase the number of the reaction sites of the silicone that are bonded to the surface of the substrate or underlayer. Thus, the article may not be sufficiently improved in making waterdrops slip down the surface thereof. If the ratio is greater than 0.5 in each of the second and third aspects of the invention, the mixed liquid may have aggregates. Furthermore, the relative amount of the silicone in the mixed liquid is decreased. Therefore, the article may not be sufficiently improved in making waterdrops slip down the surface thereof.

According to the third aspect of the invention, the amount of the fluoroalkylsilane is preferably up to 70 wt %, particularly up to 50 wt %, based on the total weight of the silicone and the fluoroalkylsilane. If it is greater than 70 wt %, the action of the fluoroalkylsilane to attract waterdrops may become too strong. With this, the article may become inferior in making waterdrops slip down the surface thereof.

Preferable examples of the first silicone are $CH_3$—$(Si(CH_3)_2$—$O)_n$—$Si(CH_3)_2OCH_3$, $CH_3$—$(Si(CH_3)_2$—$O)_n$—$SiCH_3(OCH_3)_2$, $CH_3$—$(Si(CH_3)_2$—$O)_n$—$Si(OCH_3)_3$, $CH_3$—$(Si(CH_3)_2$—$O)_n$—$Si(OC_2H_5)_3$, $CH_3$—$(Si(CH_{32}$—$O)_n$—$Si(CH_3)_2(CH_2)_3OCH_2CH(OH)CH_2NH(CH_2)_3Si(OCH_3)_3$, $CH_3$—$(Si(CH_3)_2$—$O)_n$—$Si(CH_3)_2((CH_2)_3OCH_2CH(OH)CH_2)_2$ $N(CH_2)_3Si(OCH_3)_3$, $CH_3$—$(Si(CH_3)_2$—$O)_n$—$Si(OH)_3$, $CH_3$—$(Si(CH_3)_2$—$O)_n$—$Si(CH_3)_2Cl$, $CH_3$—$(Si(CH_3)_2$—$O)_n$—$Si(CH_3)_2(CH_2)_2SiCH_3Cl_2$, $CH_3$—$(Si(CH_3)_2$—$O)_n$—$SiCl_3$, $CH_3$—$(Si(CH_3)_2$—$O)_n$—$Si(OCOCH_3)_3$, $CH_3$—$(Si(CH_3)_2$—$O)_n$—$Si(NCO)_3$, and $CH_3$—$(Si(CH_3)_2$—$O)_n$—$Si(CH_3)_2(CH_2)_3O(CH_2)_3OCONHSi(NCO)_3$. Preferable examples of the second silicone are Rf—$(CH_2)_2$—$(Si(CH_3)_2$—$O)_n$—$Si(CH_3)_2(CH_2)_3OCH_2CH(OH)CH_2NHSi(OCH_3)_3$, and (Rf—$(CH_2)_2$—$(Si(CH_3)_2$—$O)_n$—$Si(CH_3)_2(CH_2)_3OCH_2CH(OH)CH_2)_2N(CH_2)_3Si(OCH_3)_3$. In each of these preferable examples of the first and second silicones, n is greater than 13. With this, each of these preferable examples has a molecular weight of greater than 1,000. In each of these preferable examples of the second silicone, Rf is a fluoroalkyl group. This fluoroalkyl group of the second silicone may be selected from straight-chain and branched perfluoroalkyl groups each having a carbon atom number of 1–16. Of these, the fluoroalkyl group is preferably $C_8F_{17}$— in order to provide the functional layer with water-repellency and oil-repellency.

The silica precursor sol, which is used for preparing the mixed liquid, may be selected from commercial products such as SUPERCERA (trade name) of Daihachi Chemical Industry Co., CERAMICA (trade name) of Nichiita Kenkyusho Co., HAS (trade name) of Colcoat Co., ATRON SiN-500 (trade name) of Nippon Soda Co. Ltd., LICKSON COAT CGS-D1-0600 (trade name) of Chisso Co., and COLCOAT P and COLCOAT 6P (trade names) of Nippon Colcoat Co.

The fluoroalkylsilane may be selected from $CF_3CH_2CH_2Si(OCH_3)_3$ (TSL8262 (trade name) of Toshiba Silicone Co.), $CF_3CH_2CH_2SiCl_3$ (TSL8261 (trade name) of Toshiba Silicone Co.), $CF_3(CF_2)_5CH_2CH_2SiCl_3$ (TSL8256 (trade name) of Toshiba Silicone Co.), $CF_3(CF_2)_5CH_2CH_2Si(OCH_3)_3$ (TSL8257 (trade name) of Toshiba Silicone Co.), $CF_3(CF_2)_7CH_2CH_2SiCl_3$ (TSL8232 (trade name) of Toshiba Silicone Co.), $CF_3(CF_2)_7CH_2CH_2Si(OCH_3)_3$ (TSL8233 (trade name) of Toshiba Silicone Co.), $CF_3(CF_2)_7CH_2CH_2SiCH_3Cl_2$ (TSL8229 (trade name) of Toshiba Silicone Co.), and $CF_3(CF_2)_5CH_2CH_2SiCH_3(OCH_3)_2$ (TSL8231 (trade name) of Toshiba Silicone Co.). Fluoroalkyl group of the fluoroalkylsilane may be selected from straight-chain and branched perfluoroalkyl groups each having a carbon atom number of 1–16. Of these, it is preferably a straight-chain fluoroalkyl group represented by $C_8F_{17}$ in order to provide the functional layer with water-repellency and oil-repellency. Functional groups of the fluoroalkylsilane other than fluoroalkyl group are not particularly limited as long as they are hydrolyzable and thereby can chemically be bonded to the substrate or the underlayer. Preferable examples of these functional groups are alkoxysilyl groups, hydroxysilyl groups, halogenated silyl groups (e.g., Si—F, Si—Cl, Si—Br, and Si—I), acyloxysilyl groups, and isocyanate silyl groups.

The solvent, which is used for preparing the mixed liquid, is not particularly limited so long as it dissolves the components of the mixed liquid. It may be selected from primary alcohols (e.g., methanol, ethanol, and propyl alcohol), secondary alcohols (e.g., isopropyl alcohol), tertiary alcohols (e.g., t—butanol), ketones (e.g., acetone and methyl ethyl ketone), ethers, and aliphatic, aromatic and alicyclic hydrocarbons (e.g., benzene, toluene, xylene, chloroform, pentane, hexane, and cyclohexane). Of these, a polar solvent can be used alone or mixed with another solvent for dissolving the components of the mixed liquid. In contrast, a non-polar solvent can be mixed with another solvent for that. The acid, which is used for preparing the mixed liquid, is not particularly limited. It may be selected from various organic and inorganic acids.

The manner of applying the mixed liquid to the substrate or the underlayer may be dip coating, spraying, flow coating, spin coating, or roller coating.

As stated above, the special silicone is mixed with acid and water in a solvent. With this, the hydrolyzable, functional end-groups of the silicone are hydrolyzed and thereby activated. This mixing is conducted at a temperature of preferably from room temperature to 70° C., particularly from 30 to 50° C. If it is lower than room temperature, it may become difficult to sufficiently and uniformly hydrolyze the functional end-groups. Therefore, the surface of the functional layer may become uneven in making waterdrops slip down the surface. If it is higher than 70° C., hydrolysis and the subsequent polycondensation of the silicone may proceed too much. With this, the number of the reaction sites of the silicone, which are bonded to the substrate or the underlayer may becomes insufficient. Thus, the article may become inferior in making waterdrops slip down the surface thereof. The mixing of the silica precursor sol with the silicone is conducted at a temperature of preferably not higher than 50° C., particularly about room temperature. If it is higher than 50° C., aggregates may be formed by stirring. With this, the surface of the functional layer may become uneven in making waterdrops slip down the surface.

According to the first aspect of the invention, it is preferable to dry or bake the precursory layer, which has been formed by applying the mixed liquid containing the silicone, acid and water. With this, the functional groups of the functional layer are sufficiently bonded to the substrate or the underlayer. If the drying temperature is too low, the number of the reaction sites of the silicone, which are bonded to the substrate or the underlayer, may become too small. With this, the article may become inferior in making waterdrops slip down the surface thereof. If the drying temperature is higher than 250° C., the substances of the mixed liquid may partly alter or decompose by heat. With this, the article also may become inferior in making waterdrops slip down the surface thereof. The drying temperature is particularly preferably from 100 to 150° C. in order to further improve the article in making waterdrops slip down the surface thereof.

According to the second and third aspects of the invention, it is preferable to dry or bake the precursory layer, which has been formed by applying the mixed liquid containing the silicone, a silica precursor sol, acid and water, at a temperature of not higher than 250° C., more preferably not higher than 150° C. With this, the functional groups of the functional layer are sufficiently bonded to the substrate or the underlayer. If the drying temperature is higher than 250° C., the substances of the mixed liquid may partly alter or decompose by heat. With this, the article also may become inferior in making waterdrops slip down the surface thereof. If the baking temperature becomes lower, it is necessary to take more time for drying or baking the precursory layer. With this, the functional groups of the functional layer are sufficiently bonded to the substrate or the underlayer. If this drying or baking time is too short, the number of the reaction sites of the silicone and other compounds, which are bonded to the substrate or the underlayer, may become too small. With this, the article may become inferior in making waterdrops slip down the surface thereof.

In the invention, the thickness of the functional layer after its drying is preferably not greater than 100 nm. If it is greater than 100 nm, the functional layer may become inferior in transparency and strength. The article according to the invention is superior in making waterdrops slip down the surface thereof. If, for example, a waterdrop of 5 $\mu$L is put on the article, "the angle of waterdrop slippage" may be in a range of 5–30 degrees. The functional layer of the invention can be superior in transparency and thus can be not greater than 4% in haze value defined in Japanese Industrial Standard (JIS) R3212. The inventors unexpectedly found that the article of the invention can be superior to conventional water-repellent articles in making waterdrops slip down the surface thereof, even if the former and the latter are the same with respect to the contact angle of a waterdrop disposed thereon. If this contact angle is too small in the invention, the article may also become inferior in making waterdrops slip down the surface thereof. Therefore, the contact angle of a waterdrop on the article is preferably not less than 70 degrees.

The following nonlimitative Examples 1–21 are illustrative of the present invention.

EXAMPLE 1

In this example, an article was prepared in accordance with the first aspect of the invention.

A coating mixed liquid was prepared as follows. At first, a first silicone of the invention having at its end a hydrolyzable functional group, that is, a trimethoxysilyl group, was prepared by reacting a silicone (molecular weight: 5,000) having at its end an epoxy group, that is, FM-0521 (trade name) of Chisso Co., with a silane coupler having amino group and represented by the formula $NH_2CH_2CH_2CH_2Si(OCH_3)_3$, that is, KBM903 (trade name) of Shin-Etsu Chemical Co., Ltd. The obtained first silicone was dissolved in isopropanol in a manner to have a concentration of the solid matter of the silicone of 0.05 wt % in the mixture. Then, a nitric acid aqueous solution prepared by diluting nitric acid (specific gravity: 1.38) with water 200 times in terms of weight was added to the mixture to have a nitric acid concentration of 0.0048 wt % and a ratio by weight of the nitric acid aqueous solution to the solid matter of the silicone of 0.8. Then, the resultant mixture was stirred at 50° C. for 1 hr, to prepare the coating mixed liquid.

Separately, a soda-lime glass plate of Nippon Sheet Glass Co., Ltd. having widths of 75 mm and a thickness of 2 mm was cleaned as follows. At first, it was immersed in an alkali detergent liquid for at least one night. Then, this glass plate was washed with water, then dried, and then allowed to stand still. After that, the cleaned glass plate (substrate) was coated with 2 ml of the coating mixed liquid by a spin coating for 50 seconds at a rolling speed of 200 rpm. The obtained precursory layer was air-dried at room temperature for 30 min to completely evaporate the solvent. Then, the coated glass plate was dried at 120° C. for 1 hr, followed by an ultrasonic cleaning in acetone. Then, the coated glass plate was wiped with a cotton cloth moistened with isopropanol to remove the excess of the coating mixed liquid, thereby to prepare the article having a functional layer formed on the substrate.

EXAMPLE 2

In this example, Example 1 was repeated except in that the concentration of the solid matter of the silicone in the solution was changed from 0.05 wt % to 0.2 wt %.

EXAMPLE 3

In this example, Example 1 was repeated except in that the concentration of the solid matter of the silicone in the solution was changed from 0.05 wt % to 0.5 wt %.

EXAMPLE 4

In this example, Example 1 was repeated except in that the concentration of the solid matter of the silicone in the solution was changed from 0.05 wt % to 2.0 wt %.

EXAMPLE 5

In this example, Example 4 was repeated except in that there was used, in place of the first silicone of Example 1, a second silicone of the invention having at its one end a hydrolyzable functional group, that is, a trimethoxysilyl group, and at the other end a fluoroalkyl group. This second silicone was prepared by reacting a silicone (molecular weight: 4,440) having at its one end an epoxy group and at the other end a fluoroalkyl group, that is, XP1044 (trade name) of Chisso Co., with the same silane coupler as that of Example 1.

EXAMPLE 6

At first, a cleaned glass plate was prepared in the same manner as that of Example 1. Then, this glass plate (substrate) was coated with 1 mL of an acetic acid solution containing 2 wt % of tetraisocyanate silane by a spin coating at a rolling speed of 200 rpm for 50 seconds. Then, the coated glass plate was allowed to stand still at room temperature in order to accelerate (1) the bonding between the isocyanate group and the glass plate surface and (2) hydrolysis of the isocyanate group by the moisture in the air, thereby forming an underlayer on the glass plate. Then, this underlayer was coated with the same coating liquid as that of Example 4. Then, the same procedures as those of Example 1 were conducted, to form a functional layer on the underlayer.

EXAMPLE 7

In this example, an article according to the second aspect of the invention was prepared as follows.

A coating mixed liquid was prepared as follows. At first, a first silicone of the invention, which is the same as that of Example 4, and a silica precursor sol, that is, LICKSON COAT CGS-D1-0600 (trade name) of Chisso Co., were dissolved in isopropanol in a manner to have a weight ratio of the solid matter of the silica precursor sol to that of the first silicone of 0.025 in the mixture. Then, a nitric acid aqueous solution, which is the same as that of Example 1, was added to the mixture in a manner to have a ratio by weight of the nitric acid aqueous solution to the solid matter of the first silicone of 0.8. Then, the resultant mixture was stirred at room temperature for 1 hr, to prepare a coating mixed liquid. Separately, a cleaned glass plate was prepared in the same manner as that of Example 1. After that, this cleaned glass plate was coated with the obtained coating liquid, and then the same procedures as those of Example 1 were conducted, to form a functional layer on the glass plate.

EXAMPLE 8

At first, a cleaned glass plate was prepared in the same manner as that of Example 1. Then, an underlayer was formed on this glass plate in the same manner as that of Example 6. Then, a functional layer was formed on this underlayer in the same manner as that of Example 7.

EXAMPLE 9

In this example, Example 8 was repeated except in that the first silicone of Example 7 was replaced with the second silicone of Example 5.

EXAMPLE 10

In this example, Example 8 was repeated except in that the first silicone of Example 7 was replaced with a mixture of the first silicone of Example 1 and a fluoroalkylsilane $(CF_3(CF_2)_7CH_2CH_2Si(OCH_3)_3)$, that is, TSL8233 (trade name) of Toshiba Silicone Co. This fluoroalkylsilane has a hydrolyzable functional group (i.e., trimethoxysilyl group). This mixture contained 10 wt % of the solid matter of the fluoroalkylsilane, based on the total weight of the solid matter of the first silicone and the solid matter of the fluoroalkylsilane.

EXAMPLE 11

In this example, Example 10 was repeated except in that the content of the solid matter of the fluoroalkylsilane was changed from 10 wt % to 30 wt %.

EXAMPLE 12

In this example, Example 10 was repeated except in that the content of the solid matter of the fluoroalkylsilane was changed from 10 wt % to 50 wt %.

EXAMPLE 13

In this example, Example 10 was repeated except in that the content of the solid matter of the fluoroalkylsilane was changed from 10 wt % to 70 wt %.

EXAMPLE 14

In this example, Example 8 was repeated except in that the first silicone of Example 7 was replaced with another first silicone of the invention. This another first silicone, which has at its end a hydrolyzable functional group, that is, a trimethoxysilyl group, was prepared by reacting a silicone (molecular weight: 10,000) having at its end an epoxy group, that is, FM-0525 (trade name) of Chisso Co., with the same silane coupler as that of Example 1.

EXAMPLE 15

In this example, Example 8 was repeated except in that the weight ratio of the solid matter of the silica precursor sol to that of the first silicone was 0.125.

EXAMPLE 16

In this example, Example 8 was repeated except in that the weight ratio of the solid matter of the silica precursor sol to that of the first silicone was 0.25.

EXAMPLE 17

In this example, Example 8 was repeated except in that the weight ratio of the solid matter of the silica precursor sol to that of the first silicone was 0.5.

EXAMPLE 18

In this example, Example 8 was repeated except in that the drying temperature was changed from 140° C. to room temperature and that the drying time was changed from 30 minutes to 24 hr.

EXAMPLE 19

In this example, Example 8 was repeated except in that the drying temperature was changed from 140° C. to 250° C.

EXAMPLE 20

In this example, Example 8 was repeated except in that the first silicone of Example 8 was replaced with another first silicone of the invention, which has at its one end a trihydroxysilyl group as a functional group.

EXAMPLE 21

In this example, Example 8 was repeated except in that the first silicone of Example 8 was replaced with another first silicone of the invention, which has at its one end a dimethylchlorosilyl group as a functional group.

COMPARATIVE EXAMPLE 1

In this comparative example, Example 1 was repeated except in that the addition of acid and water (i.e., the nitric acid aqueous solution) was omitted in the preparation of the coating liquid.

COMPARATIVE EXAMPLE 2

In this comparative example, Example 1 was repeated except in that the concentration of the solid matter of the silicone was changed from 0.05 wt % to 0.01 wt % in the preparation of the coating liquid.

COMPARATIVE EXAMPLE 3

In this comparative example, Example 5 was repeated except in that the concentration of the solid matter of the silicone was changed from 0.05 wt % to 25 wt %, and the addition of acid and water was omitted, in the preparation of the coating liquid.

COMPARATIVE EXAMPLE 4

In this comparative example, Example 10 was repeated except in that the amount of the solid matter of the fluoroalkylsilane was changed from 10 wt % to 90 wt %.

COMPARATIVE EXAMPLE 5

In this comparative example, Example 8 was repeated except in that the first silicone of Example 8 was replaced with another silicone. This another silicone, which has at its end a hydrolyzable functional group, that is, a trimethoxysilyl group, was prepared by reacting a silicone (molecular weight: 1,000) having at its end an epoxy group, that is, FM-0511 (trade name) of Chisso Co., with the same silane coupler as that of Example 1.

COMPARATIVE EXAMPLE 6

In this comparative example, Example 7 was repeated except in that the weight ratio of the solid matter of the silica precursor sol to that of the first silicone was 1.00.

COMPARATIVE EXAMPLE 7

In this comparative example, Example 8 was repeated except in that the drying temperature was changed from 140° C. to 400° C.

COMPARATIVE EXAMPLE 8

In this comparative example, Example 8 was repeated except in that the stirring temperature for preparing the coating liquid was changed from 50° C. to 60° C. and that the weight ratio of the solid matter of the silica precursor sol to that of the first silicone was 1.00.

Evaluation Tests

The articles prepared in accordance with Examples 1–21 and Comparative Examples 1–8 were subjected to the following evaluation tests.

As a first evaluation test, each article was subjected to the measurement of the angle of waterdrop slippage. This test was conducted by using a CA-X type full automatic contact angle meter of Kyowa Kaimen Kagaku Co. equipped with a SA-11 type system having a tiltable table. At first, the article was put on the tiltable table in a manner to set the article horizontal. Under this condition, a waterdrop in a predetermined amount (see Table) was disposed on the functional layer of the article. Then, the table was tilted at an angular speed of 1 degree per second. When the waterdrop started slipping down the surface of the functional layer, the angle of the article to the level was recorded as the angle of waterdrop slippage. The same measurement was repeated three times in total, and its average was recorded as the result (see Table).

As a second evaluation test, each article was subjected to the measurement of the contact angle of a waterdrop disposed on the functional layer of the article. This test was conducted by using a CA-X type full automatic contact angle meter or CA-D type contact angle meter of Kyowa Kaimen Kagaku Co. The same measurement was repeated three times in total, and its average was recorded as the result (see Table).

As a third evaluation test, each article was subjected to the measurement of haze value. This test was conducted in accordance with JIS R3212 by using a HM-65 Haze Meter of Murakami Shikisai Gijutu Kenkyusho Co. and the standard illuminant A. It was found by this test that all of the tested articles were not greater than 4% in haze value and thereby proved to be superior in transparency.

The substrate used in the invention may be made of an inorganic glass or a plastic and can be used as a vehicular window pane. Alternatively, the substrate may be a vehicular outside mirror comprising a plate having at least one light-reflective coating formed on at least one major surface of the plate.

TABLE

| | Underlayer | Silicone Solid Matter Conc. (wt %) | Silicone Molecular Weight | Silicone Functional Group | Nitric Acid Conc.*2 | Silica Precursor Sol*3 | FAS*4 | Coating Liquid Mixing Temp.(° C.) | Coating Liquid Mixing Time(hr) | Drying Temp.(° C.) | Drying Time(hr) | Contact Angle (°) | Angle of Waterdrop Slippage (°) 5 μL | 10 μL | 20 μL | 50 μL |
|---|---|---|---|---|---|---|---|---|---|---|---|---|---|---|---|---|
| Ex. 1 | No | 0.05 | 5,000 | —Si(OCH$_3$)$_3$ | 0.0048 | — | — | 50 | 1.0 | 120 | 1.0 | 98.7 | 30 | 20 | 12 | 8 |
| Ex. 2 | No | 0.20 | 5,000 | —Si(OCH$_3$)$_3$ | 0.0048 | — | — | 50 | 1.0 | 120 | 1.0 | 102.4 | 28 | 18 | 9 | 6 |
| Ex. 3 | No | 0.50 | 5,000 | —Si(OCH$_3$)$_3$ | 0.0048 | — | — | 50 | 1.0 | 120 | 1.0 | 101.5 | 25 | 15 | 8 | 5 |
| Ex. 4 | No | 2.00 | 5,000 | —Si(OCH$_3$)$_3$ | 0.0048 | — | — | 50 | 1.0 | 120 | 1.0 | 102.8 | 23 | 12 | 7 | 4 |
| Ex. 5 | No | 2.00 | 4440*5 | —Si(OCH$_3$)$_3$ | 0.0048 | — | — | 50 | 1.0 | 120 | 1.0 | 105.2 | 24 | 16 | 8 | 5 |
| Ex. 6 | Yes | 2.00 | 5,000 | —Si(OCH$_3$)$_3$ | 0.0048 | — | — | 50 | 1.0 | 120 | 1.0 | 104.7 | 24 | 14 | 7 | 4 |
| Ex. 7 | No | 2.00 | 5,000 | —Si(OCH$_3$)$_3$ | 0.0048 | 0.025 | — | RT | 1.0 | 140 | 0.5 | 102.7 | 16 | 11 | 6 | 3 |
| Ex. 8 | Yes | 2.00 | 5,000 | —Si(OCH$_3$)$_3$ | 0.0048 | 0.025 | — | RT | 1.0 | 140 | 0.5 | 103.5 | 8 | 4 | 3 | 1 |
| Ex. 9 | Yes | 2.00 | 4440*5 | —Si(OCH$_3$)$_3$ | 0.0048 | 0.025 | — | RT | 1.0 | 140 | 0.5 | 103.8 | 10 | 4 | 3 | 2 |
| Ex. 10 | Yes | 2.00 | 5,000 | —Si(OCH$_3$)$_3$ | 0.0048 | 0.025 | 10 | RT | 1.0 | 140 | 0.5 | 102.9 | 6 | 4 | 3 | 2 |
| Ex. 11 | Yes | 2.00 | 5,000 | —Si(OCH$_3$)$_3$ | 0.0048 | 0.025 | 30 | RT | 1.0 | 140 | 0.5 | 102.9 | 14 | 7 | 5 | 1 |
| Ex. 12 | Yes | 2.00 | 5,000 | —Si(OCH$_3$)$_3$ | 0.0048 | 0.025 | 50 | RT | 1.0 | 140 | 0.5 | 103.3 | 17 | 5 | 4 | 2 |
| Ex. 13 | Yes | 2.00 | 5,000 | —Si(OCH$_3$)$_3$ | 0.0048 | 0.025 | 70 | RT | 1.0 | 140 | 0.5 | 102.8 | 25 | 11 | 5 | 3 |
| Ex. 14 | Yes | 2.00 | 10,000 | —Si(OCH$_3$)$_3$ | 0.0048 | 0.025 | — | RT | 1.0 | 140 | 0.5 | 103.7 | 8 | 5 | 3 | 1 |
| Ex. 15 | Yes | 2.00 | 5,000 | —Si(OCH$_3$)$_3$ | 0.0048 | 0.125 | — | RT | 1.0 | 140 | 0.5 | 103.0 | 7 | 4 | 3 | 2 |
| Ex. 16 | Yes | 2.00 | 5,000 | —Si(OCH$_3$)$_3$ | 0.0048 | 0.25 | — | RT | 1.0 | 140 | 0.5 | 102.9 | 11 | 9 | 6 | 4 |
| Ex. 17 | Yes | 2.00 | 5,000 | —Si(OCH$_3$)$_3$ | 0.0048 | 0.5 | — | RT | 1.0 | 140 | 0.5 | 103.3 | 16 | 12 | 8 | 5 |
| Ex. 18 | Yes | 2.00 | 5,000 | —Si(OCH$_3$)$_3$ | 0.0048 | 0.025 | — | RT | 1.0 | RT | 24.0 | 103.6 | 5 | 3 | 2 | 1 |
| Ex. 19 | Yes | 2.00 | 5,000 | —Si(OCH$_3$)$_3$ | 0.0048 | 0.025 | — | RT | 1.0 | 250 | 0.5 | 102.6 | 7 | 6 | 4 | 3 |
| Ex. 20 | Yes | 2.00 | 5,000 | —Si(OH)$_3$ | 0.0048 | 0.025 | — | RT | 1.0 | 140 | 0.5 | 103.3 | 10 | 6 | 4 | 3 |
| Ex. 21 | Yes | 2.00 | 5,000 | —Si(CH$_3$)$_2$Cl | 0.0048 | 0.025 | — | RT | 1.0 | 140 | 0.5 | 102.9 | 12 | 8 | 6 | 3 |
| Com. Ex. 1 | No | 2.00 | 5,000 | —Si(OCH$_3$)$_3$ | 0.0048 | — | — | 50 | 1.0 | 120 | 1.0 | 104.6 | 46 | 23 | 17 | 11 |
| Com. Ex. 2 | No | 0.01 | 5,000 | —Si(OCH$_3$)$_3$ | 0.0048 | — | — | 50 | 1.0 | 120 | 1.0 | 102.3 | 90* | 70 | 49 | 20 |
| Com. Ex. 3 | No | 25.00 | 4440*5 | —Si(OCH$_3$)$_3$ | — | — | — | 50 | 1.0 | 120 | 1.0 | 101.3 | 90* | 55 | 28 | 13 |
| Com. Ex. 4 | Yes | 2.00 | 5,000 | —Si(OCH$_3$)$_3$ | 0.0048 | 0.025 | 90 | RT | 1.0 | 140 | 0.5 | 103.8 | 53 | 26 | 16 | 10 |
| Com. Ex. 5 | Yes | 2.00 | 1,000 | —Si(OCH$_3$)$_3$ | 0.0048 | 0.025 | — | RT | 1.0 | 140 | 0.5 | 100.6 | 36 | 33 | 26 | 14 |
| Com. Ex. 6 | No | 2.00 | 5,000 | —Si(OCH$_3$)$_3$ | 0.0048 | 1.00 | — | RT | 1.0 | 140 | 0.5 | 100.7 | 90* | 90* | 53 | 28 |
| Com. Ex. 7 | Yes | 2.00 | 5,000 | —Si(OCH$_3$)$_3$ | 0.0048 | 0.025 | — | RT | 1.0 | 400 | 0.5 | 96.4 | 55 | 35 | 15 | 9 |
| Com. Ex. 8 | Yes | 2.00 | 5,000 | —Si(OCH$_3$)$_3$ | 0.0048 | 1.00 | — | 60 | 1.0 | 140 | 0.5 | 104.8 | 90* | 90* | 70 | 36 |

90*: Waterdrop did not sip down even at 90 degrees of the article to the level. RT: room temperature.
*2: wt % of nitric acid, based on the total weight of the mixed liquid.
*3: weight ratio of the silica precursor sol solid matter to the silicone solid matter.
*4: wt % of the FAS solid matter, based on the total weight of the FAS solid matter and the silicone solid matter.
*5: silicone having a fluoroalkyl end-group.

The entire contents of Japanese Patent Application P10-319397 (filed Nov. 10, 1998), of which priority is claimed in the application, are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. An article superior in slipping a waterdrop down a surface of said article, said article comprising:

a substrate;

an underlayer formed on said substrate;

a functional layer formed on a surface of said underlayer, said functional layer being chemically bonded to a surface of said underlayer through siloxane-bonding, wherein said article is prepared by a method comprising:
        applying a coating liquid containing a hydrolyzable silicon compound to said substrate, thereby to form thereon said underlayer;
        dissolving in a solvent (1) a silicone that is one of a first silicone having at an end a hydrolyzable functional group directly bonded to a silicon atom of said first silicone and a second silicone having at an end a hydrolyzable functional group directly bonded to a silicon atom of said second silicone and at the other end a fluoroalkyl group, (2) an acid, and (3) water, thereby to prepare a mixed liquid;
        applying said mixed liquid to said surface of said underlayer, thereby to form thereon a precursory layer; and
        drying said precursory layer into said functional layer.

2. An article according to claim 1, wherein said hydrolyzable silicon compound for forming said underlayer is tetraisocyanate silane, and wherein said coating liquid is turned into said underlayer that is a silica film through hydrolysis of said tetraisocyanate silane.

3. An article according to claim 1, wherein a solid matter of said silicone is in an amount of 0.05–20 wt %, based on a total weight of said mixed liquid.

4. An article according to claim 1, wherein said silicone has a molecular weight of greater than 1,000.

5. An article according to claim 1, wherein each hydrolyzable functional group of said first and second silicones is at least one group selected from the group consisting of alkoxysilyl groups, hydroxysilyl groups, halogenated silyl groups, acyloxysilyl groups, and isocyanate silyl groups.

6. An article according to claim 1, wherein said substrate is a window pane.

7. An article according to claim 6, wherein said window pane is made of an inorganic glass or a plastic.

8. An article according to claim 6, wherein said window pane is a vehicular window pane.

9. An article according to claim 1, wherein said substrate is a mirror.

10. An article according to claim 9, wherein said mirror comprises a plate made of an inorganic glass or a plastic, said plate having at least one light-reflective coating formed on at least one major surface of said plate.

11. An article according to claim 9, wherein said mirror is a vehicular outside mirror.

12. An article superior in slipping a waterdrop down a surface of said article, said article comprising:

a substrate; and a functional layer formed on a surface of said substrate, said functional layer being chemically bonded to said surface of said substrate through siloxane-bonding, wherein said article is prepared by a method comprising:
        dissolving in a solvent (1) a silicone that is one of a first silicone having at an end a hydrolyzable functional group and a second silicone having at an end a hydrolyzable functional group and at the other end a fluoroalkyl group, (2) a silica precursor sol, (3) an acid, and (4) water, thereby to prepare a mixed liquid;
        applying said mixed liquid to said surface of said substrate, thereby to form thereon a precursory layer; and
        drying said precursory layer into said functional layer.

13. An article superior in slipping a waterdrop down a surface of said article, said article comprising:

a substrate; and a functional layer formed on a surface of said substrate; said functional layer being chemically bonded to said surface of said substrate through siloxane-bonding, wherein said article is prepared by a method comprising:
        dissolving in a solvent (1) a silicone that is one of a first silicone having at an end a hydrolyzable functional group and a second silicone having at an end a hydrolyzable functional group and at the other end a fluoroalkly group, (2) a fluoroalkylsilane having at an end a hydrolyzable functional group (3) a silica precursor sol, (4) an acid, and (5) water,
        applying said mixed liquid to said surface of said substrate, thereby to form thereon a precursory layer; and
        drying said precursory layer into said functional layer.

14. An article according to claim 13, wherein a solid matter of said fluoroalkylsilane is in an amount of up to 70 wt %, based on a total weight of a solid matter of said silicone and that of said fluoroalkylsilane.

15. An article superior in slipping a waterdrop down a surface of said article, said article comprising:

a substrate;

an underlayer formed on said substrate;

a functional layer formed on a surface of said underlayer, said functional layer being chemically bonded to a surface of said underlayer through siloxane-bonding, wherein said article is prepared by a method comprising:
        applying a coating liquid containing a hydrolyzable silicon compound to said substrate, thereby to form thereon said underlayer;
        dissolving in a solvent (1) a silicone that is one of a first silicone having at an end a hydrolyzable functional group directly bonded to a silicone atom of said first silicone and a second silicone having at an end a hydrolyzable functional group directly bonded to a silicon atom of said second silicone and at the other end a fluoroalkyl group, (2) a silica precursor sol, (3) an acid, and (4) water, thereby to prepare a mixed liquid;
        applying said mixed liquid to said surface of said underlayer, thereby to form thereon a precursory layer; and
        drying said precursory layer into said functional layer.

* * * * *